(12) United States Patent
Saliba et al.

(10) Patent No.: US 8,577,035 B2
(45) Date of Patent: Nov. 5, 2013

(54) ELECTRONIC CIRCUIT FOR SECURING DATA INTERCHANGES BETWEEN A COMPUTER STATION AND A NETWORK

(75) Inventors: Eric Saliba, Chatou (FR); Philippe Leleu, Valmondois (FR)

(73) Assignee: Thales, Neuilly-sur-Seine (FR)

( * ) Notice: Subject to any disclaimer, the term of this patent is extended or adjusted under 35 U.S.C. 154(b) by 841 days.

(21) Appl. No.: 12/624,949

(22) Filed: Nov. 24, 2009

(65) Prior Publication Data

US 2010/0132046 A1 May 27, 2010

(30) Foreign Application Priority Data

Nov. 25, 2008 (FR) ...................... 08 06611

(51) Int. Cl.
*G06F 9/00* (2006.01)
*H04L 29/06* (2006.01)
*H04K 1/00* (2006.01)

(52) U.S. Cl.
USPC ........................... 380/255; 713/150; 713/100

(58) Field of Classification Search
None
See application file for complete search history.

(56) References Cited

U.S. PATENT DOCUMENTS

| | | | |
|---|---|---|---|
| 5,299,314 A * | 3/1994 | Gates ............................. | 710/64 |
| 6,651,190 B1 | 11/2003 | Worley et al. | |
| 7,325,746 B2 * | 2/2008 | Nishizawa et al. ........... | 235/492 |
| 7,428,605 B2 * | 9/2008 | Ni et al. .......................... | 710/62 |
| 2004/0268138 A1 * | 12/2004 | Larson et al. ................ | 713/200 |
| 2004/0268147 A1 | 12/2004 | Wiederin et al. | |
| 2005/0203987 A1 * | 9/2005 | Ewing et al. .................. | 709/200 |

FOREIGN PATENT DOCUMENTS

NL   9 400 460 A   11/1995

* cited by examiner

*Primary Examiner* — David Y Jung
(74) *Attorney, Agent, or Firm* — Baker & Hostetler LLP

(57) ABSTRACT

The present invention relates to an electronic circuit for securing data interchanges between a computer station and a network, said circuit comprising a first network interface connected to said network, said circuit comprising at least a second network interface connected to a network interface of said computer station, a unit for processing data passing between the first network interface and the second network interface, an interface for connection to an internal bus of the computer station suitable for electrically connecting the power supply, said electronic circuit not comprising any means of transferring processed data with the bus of said station. The invention applies in particular to the protection of personal computers handling confidential data.

11 Claims, 3 Drawing Sheets

ELECTRONIC CIRCUIT FOR SECURING DATA INTERCHANGES BETWEEN A COMPUTER STATION AND A NETWORK

CROSS-REFERENCE TO RELATED APPLICATIONS

This application claims priority of French application no. FR 08/06611, filed Nov. 25, 2008, the disclosure of which is hereby incorporated by reference in its entirety.

FIELD OF THE INVENTION

The present invention relates to an electronic circuit for securing data interchanges between a computer station and a network. The invention applies notably to the protection of personal computers handling confidential data.

BACKGROUND OF THE INVENTION

Networking a computer station generally results in the appearance of threats to said station. These threats can be of an accidental nature, when they appear for example as a result of negligence or via virus propagation; they can also be intentional in nature, for example via targeted attacks to obtain information or to destroy data. To counter these threats, two main categories of solutions currently coexist: hardware firewalls and personal software firewalls.

A personal software firewall is a computer program installed on the station to be protected and making it possible to define detailed and customized security policies, in other words policies that are suited to each user of the station. However, this type of firewall remains vulnerable to its software environment and to the users who operate the computer station. Another drawback of the software firewall is that it is dependent on the operating system and on the type of platform on which it is installed. Furthermore, the circumvention of the protection conferred by a software firewall via privilege-raising techniques is well known, as is shown for example by L. Duflot, O. Grumelard and D. Etiemble in their article entitled "Utiliser les fonctionnalités des cartes mères ou des processeurs pour contourner les mécanismes de sécurité des systèmes d'exploitation" [Using the functionalities of mother cards or processors to circumvent operating system security mechanisms], published in the Symposium on the security of information technologies and communications (SSTIC), and dated May 2006. These techniques can be used to act on the hardware and software elements of the computer station, and even take control of them.

Unlike the software firewall, a hardware firewall is conventionally positioned in series on a network so as to protect a number of computer stations against the threats deriving from an external network. However, this type of firewall does not make it possible to protect the computer stations connected to the same local area network and situated behind said firewall. Furthermore, an overall security policy (for each local area network) is generally selected so as to retain flexibility of configuration and therefore facilitate the deployment of new stations; this overall security policy runs counter to the determination to adapt the control to each station by defining detailed and customized security policies. Finally, end-to-end encryption is excluded by this type of firewall, because the analysis of encrypted datastreams is difficult, even impossible to perform. The data must therefore be decrypted at the level of the hardware firewall, and not at the level of the final recipient of the data, which introduces a security failing and additional installation, configuration and maintenance constraints.

An alternative is proposed by the company 3COM, which sells a network card referenced by the product number 3CRFW200B and offering firewall functionalities. This card is connected to a PCI port of a computer, PCI being the acronym for "Peripheral Component Interconnect", and offers a network interface. The data obtained from the network are received via said interface, processed by the card, then transmitted to the computer via the PCI bus. However, this card poses a number of security problems. On the one hand, it is easy, for a person using the computer station, to intentionally circumvent the protection conferred by said card by disconnecting the network cable from the station to reconnect it to a standard network interface of the computer station. On the other hand, the security policy of the card can be configured via a graphical interface, which renders the card vulnerable to operating errors on the part of the user, to disturbances or malicious intent from the operating system or the surrounding software, even to hardware malfunctions.

SUMMARY OF THE INVENTION

One aim of the invention is to propose means of securing data interchanges between a computer station and a network that provide control functions as close as possible to the users, offer control mechanisms that are independent of the station to be protected and unintrusive to the user data contained on this station, while ensuring a series-positioning of the securing means between the network and the station. To this end, the subject of the invention is an electronic circuit for securing data interchanges between a computer station and a network, said circuit comprising a first network interface connected to said network, said circuit being characterized in that it comprises at least:
- a second network interface connected to a network interface of said computer station,
- a unit for processing data passing between the first network interface and the second network interface,
- an interface for connection to an internal bus of the computer station suitable for electrically connecting the power supply,
- said electronic circuit not comprising any means of transferring processed data with the bus of said station.

The securing circuit according to the invention makes it possible to achieve a high level of protection. In practice, no software interaction exists between the securing circuit and the computer station, and the hardware interaction with said station is limited to the electrical power supply and to the network connections, so that, unlike the software firewalls or the firewall electronic cards of the prior art, the operation of the securing circuit is totally independent and presents no risk of being disturbed by malfunctions deriving from its environment. Moreover, the securing circuit is placed in series between the network and the computer station; in other words, for a data item to be transferred from the network to the station or from the station to the network, this data item must necessarily pass through the securing circuit.

According to one embodiment, the securing circuit according to the invention is mounted in the casing of the computer station, so that only the network interfaces of said circuit are physically accessible from outside the computer station, an external network interface of the computer station being able to be linked to a network interface of said circuit by a network cable connected to the outside of the casing of the computer station. Thus, according to this embodiment, the securing circuit according to the invention is almost transparent from the point of view of the user of the computer station. In practice, from the point of view external to the casing, the circuit is visible only on its side comprising the network interfaces. Preferably, a small network cable is used to connect the two network interfaces of the securing circuit, so as not to hamper the user or affect the aesthetic aspect of the station.

According to one embodiment, the securing circuit according to the invention is installed in an office personal computer, the circuit being implanted on an integrated electronic card, the connection interface for the electrical power supply to said circuit being formed by a connector of said card, said connector being suitable for being plugged into a slot of the mother card of said computer. According to this embodiment, the securing circuit according to the invention is connected to the computer station via standard means, which makes it possible to use said circuit on conventional equipment, without requiring any hardware adaptation.

Furthermore, when the computer comprises an internal bus of "Peripheral Component Interconnect" (PCI) type, the connector of the electronic card can be suitable for being plugged into a slot of "Peripheral Component Interconnect" type linked to said internal bus. The securing circuit can therefore benefit from a standard that is widely used in computer stations, such as the PCI and PCI express (PCIe) standard.

When the personal computer comprises, inside the casing, a reset control switch and/or a control switch for switching off said computer, the securing circuit according to the invention can comprise a module for detecting an anomaly, said module being linked to the reset control switch or to the control switch for switching off the computer. The securing circuit can thus prevent any attempt to circumvent the protection by triggering a computer blocking signal.

According to one embodiment, the securing circuit according to the invention comprises an external interface for configuring security parameters to be applied by the processing unit, a memory for storing said security parameters and a battery suitable for powering said memory in order to maintain the status of said parameters when said circuit is no longer electrically powered. This embodiment makes it possible to refine the security policies to be applied by parameterizing the behaviour of the securing circuit to be adapted, for example, to a particular computer station or to a particular user.

The securing circuit according to the invention can comprise a cryptographic module suitable for encrypting and/or decrypting the data incoming to and outgoing from said circuit, which confers a major advantage on said circuit. In practice, a firewall must decrypt the encrypted streams to analyse them. Now, a conventional hardware firewall cannot be implanted at the level of a user computer station. Also, unlike a configuration involving a conventional hardware firewall, in which the data from the network are first decrypted at the level of said firewall before being transmitted uncoded to the recipient computer station, the decryption of the data can be performed at the level of the securing circuit according to the invention. It is therefore possible to perform end-to-end encryption.

The securing circuit according to the invention can comprise a persistent data memory, said memory storing the programs needed for startup via the network, according to the "Pre-boot eXecution Environment" technique.

According to one embodiment, the securing circuit according to the invention comprises an IEEE 802.1x-standardized authentication module and a persistent data memory, said memory storing authentication certificates used by the authentication module.

Another subject of the invention is a system for securing a computer installation, each computer station to be secured comprising an electronic securing circuit as described above, each of said stations being connected via the network to a management station suitable for supervising and/or configuring the electronic circuits present in said stations.

Another subject of the invention is a method for securing data passing between a computer station and a network, said method implementing a securing circuit electrically powered by said station, said circuit comprising at least one processing unit and two network interfaces, the first network interface being connected to said network, the second network interface being linked to a network interface of said station, said circuit being mounted inside the computer station, the method comprising at least the following steps:

receiving data over the first network interface of said circuit;

securing the data by the processing unit;

transmitting the processed data to the second network interface.

BRIEF DESCRIPTION OF THE DRAWINGS

Other characteristics will emerge from reading the following detailed description given by way of nonlimiting example and in light of the appended drawings that represent.

DETAILED DESCRIPTION OF THE INVENTION

In the interests of clarity, the same references in different figures designate the same elements.

Figure 1A:
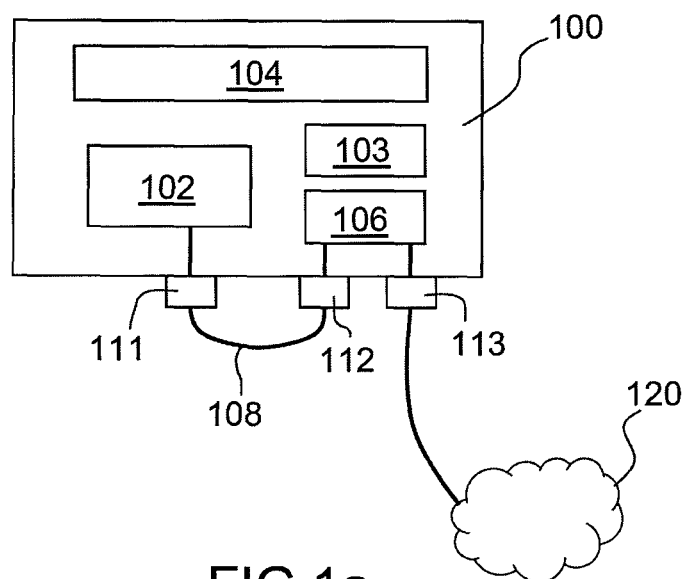
FIGS. 1a and 1b, diagrams illustrating the operation of a securing circuit according to the invention, FIG. 2, a diagram detailing the structure of a securing circuit according to the invention, FIG. 3, a diagram illustrating a second embodiment of the securing circuit according to the invention, FIG. 4, a diagram illustrating an architecture comprising a management station associated with a number of computer stations each comprising a securing circuit according to the invention.
Figure 1B:
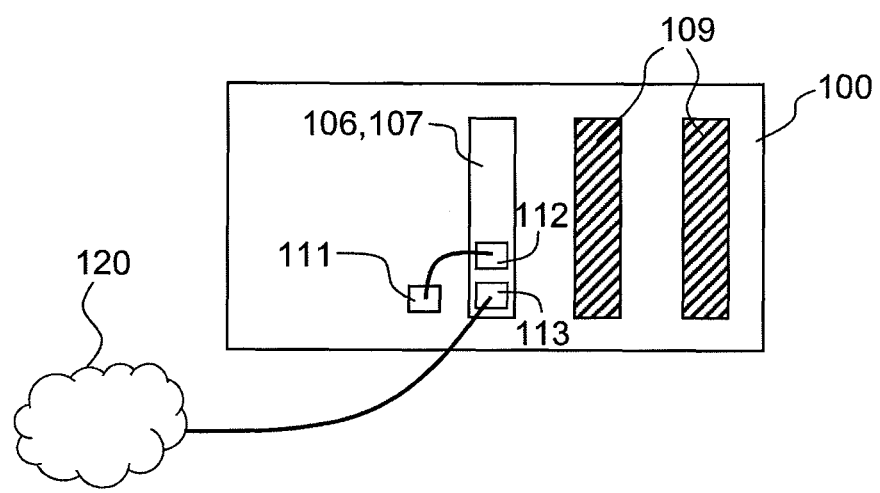

FIGS. 1a and 1b illustrate, through diagrams, the operation of a securing circuit according to the invention. FIG. 1a is a diagram showing the integration of a securing circuit according to the invention in a computer station. FIG. 1b is a rear view of a host computer station, that is to say a computer station on which said securing circuit is installed.

A computer station, for example a personal computer 100, comprises at least one network interface 102 provided with an external connector 111, an internal bus 103 and executes software 104, notably an operating system. The personal computer 100 also comprises an electronic securing circuit 106 according to the invention, which is provided with two network interfaces, for example two external connectors 112, 113. The securing circuit 106 is mounted in the personal computer 100 so that only its external connectors 112, 113 are accessible to the user of the computer 100; in the example, the securing circuit 106 is implemented on an electronic card 107 mounted inside the casing of the computer 100, alongside other cards 109.

The computer 100 is connected to a computer network 120. If the electronic circuit according to the invention were not used, the computer 100 would be connected to said network 120 directly via the external connector 111 of its network interface 102. In the example, since the computer 100 uses the securing circuit 106 according to the invention, it is therefore connected to the computer network 120 via the first connector 113 of the securing circuit 106, the second connector 112 of said circuit 106 being connected, via a simple network cable 108, to the external connector 111 of the network interface 102 of the computer 100. Thus, the data obtained from the computer network 120 are first received by the first connector 113 of the securing circuit 106, these data are processed by said circuit 106, then transmitted to the network interface 102 of the computer 100 via, respectively, the second network connector 112 of the securing circuit 106 and the external connector 111 of the network interface 102 of the computer 100.

Figure 2:
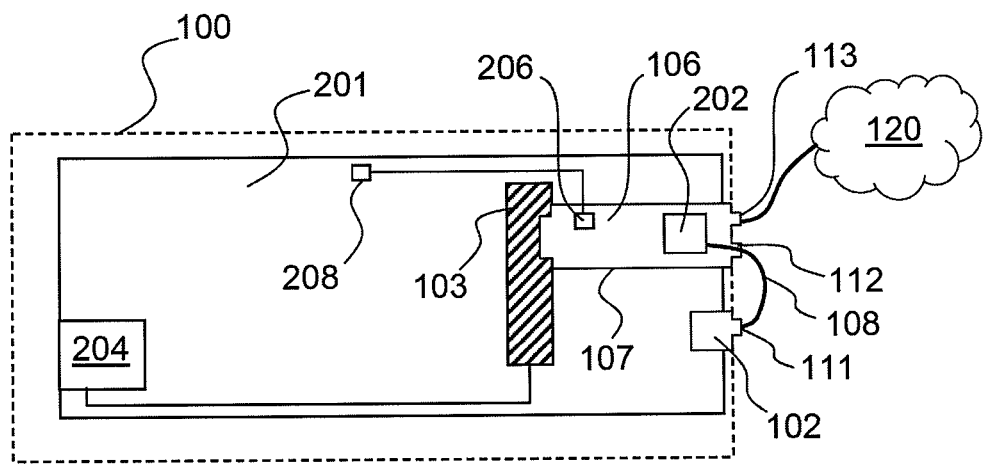

FIG. 2 details, through a diagram, the structure of a securing circuit according to the invention. In the example, the securing circuit 106 is implanted on the electronic card 107 plugged into an available slot of the mother card 201 of the computer to be electrically powered. For example, the electronic card is plugged into a slot connected to a bus 103 of "Peripheral Component Interconnect" (PCI) or PCI express (PCIe) type, this type of bus being electrically powered 204. Unlike devices known from the prior art, the securing circuit 106 according to the invention exchanges no data with the bus 103 to which it is connected. Moreover, the securing circuit 106 includes a processing unit 202 making it possible to apply a security policy to the data passing through said circuit 106. For example, this processing unit 202 filters certain types of data that are not authorized, performs authentication checks, and performs a syntactical and/or semantic analysis of the data to ensure against attempted network attacks and the appearance of auxiliary channels.

In the embodiment of FIG. 2, the securing circuit 106 comprises a module 206 handling the detection of a security anomaly of the type of disconnection of the network cable 108 connected to the second network connector 112 of the securing circuit 106. In the proposed embodiment, the module 206 is linked to a reset switch 208 present on the mother card 201 of the computer 100, so that, when a security anomaly is detected by the module 206, a reset signal for the computer 100 is triggered. The module 206 also detects the disconnection of the cable 108 at the level of the interface 111, for example via an Ethernet controller associated with the second connector 112 which detects the loss of the Ethernet connection on this second connector 112. When an anomaly is detected, for example if the network cable 108 is disconnected from the second connector 112 of the securing circuit 106, then a signal is transmitted to the reset switch 208 of the mother card 201 of the computer station 100 thus forcing the activation of the command to reset the mother card 201 via signal to block its activity.

Figure 3:
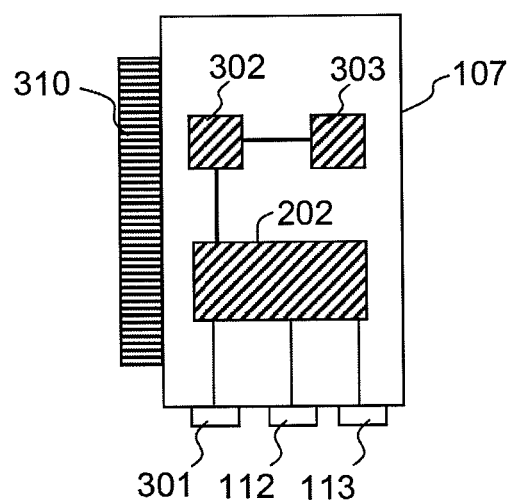

FIG. 3 presents an embodiment in which the securing circuit 106 comprises an external configuration interface 301, for example a serial port, enabling an administrator to parameterize the security policies to be applied. The internal bus connector of the electronic card 107 on which the securing circuit 106 is implanted is referenced 310 in FIG. 3. According to this embodiment, the securing circuit 106 also comprises a storage memory 302 making it possible to store the parameters, events and security states and an electrical battery 303 to power said memory when the securing circuit 106 is no longer powered by the host computer station 100.

The external configuration interface 301 is suitable, for example, for connection to a biometric terminal, a keyboard or a mini keyboard to enable an administrator to be authenticated with a password or a biometric datum.

The circuit according to the invention can advantageously host services or sensitive data on a persistent data memory, the latter then being protected from malfunctions or security failings inherent in a computer station. In the example, the persistent data memory is the storage memory 302 used to store the security parameters.

As an example, a securing circuit according to the invention can be used to host services that are intrinsically vulnerable, such as the DHCP (Dynamic Host Configuration Protocol) or DNS (Domain Name Service) services. Thus, it can provide a DNS cache service in order to protect said service from attacks from the cache of the operating system. The securing circuit can also provide a reliable time to the host computer station. In practice, a time made available by a protocol such as NTP (Network Time Protocol) is maintained locally by a clock of the securing circuit according to the invention.

Regarding the protection of the sensitive data, the securing circuit according to the invention can, for example, be used to store authentication certificates, for example the authentication certificates of the IEEE 802.1x-standardized protocols, whereas, in the prior art, the latter are stored permanently on the hard disk of the host station.

Moreover, the starting up of a station hosting a circuit according to the invention can be secured via the use of a startup from the network, a technique more commonly designated by the acronym PXE which stands for "Pre-boot eXecution Environment". The securing circuit of the station then comprises the services necessary to the PXE startup and it recovers the startup configuration, from a memory present on the securing circuit or in a secure manner from a server via protected interchanges.

According to another embodiment of the circuit according to the invention, the securing circuit comprises a cryptographic module thus making it possible to perform end-to-end encryption/decryption.

Unlike the conventional approach involving centralized protection of a computer installation, generally involving the use of one or more hardware firewalls placed at critical points in the network, the approach employed to protect a number of computer stations with the circuit according to the invention is a distributed approach, since each securing circuit can apply its own security policy adapted to the station on which it is installed.

Figure 4:
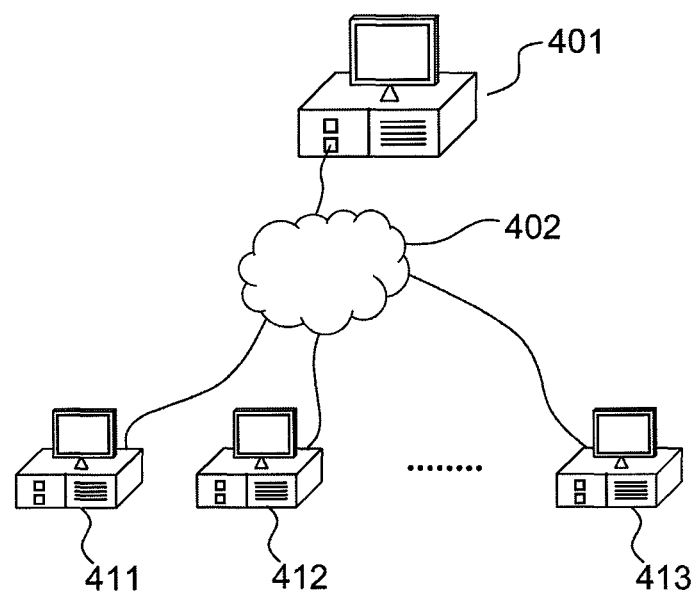

Nevertheless, as illustrated by FIG. 4, a centralized management of the securing circuits according to the invention, at least in part, may be useful, notably when the number of stations to be protected becomes large.

Thus, a management station 401 is connected, via the network 402, to a number of computer stations 411, 412, 413 each comprising a securing circuit according to the invention. Depending on the requirements of the administrator responsible for the management station 401, this station 401 may, for example, make it possible to take charge of the rise in security alarms or events deriving from securing circuits, apply overall security policies and/or security policies specific to each computer station 411, 412, 413, distribute certificates and revocation lists, or even facilitate maintenance of the securing circuits by applying patches or by activating new services. Moreover, in the case where the securing circuits included in the computer stations 411, 412, 413 include a module 206 for detecting anomalies (see FIG. 2), then the management station 401 can also be used to launch a command to block a number of computer stations in the case where, for example, serious security alarms are raised.

The benefits of the securing circuit according to the invention are many. First of all, the securing circuit according to the invention is almost transparent to the user. In practice, on the one hand, there is no software driver to be installed and from the hardware point of view, only an edge of the securing circuit—the one comprising the network connectors—is accessible to the user, a network cable, preferably short and therefore not a hindrance, being connected between the circuit and the standard network interface of the computer station.

Then, because of the absence of software interaction with the computer station on which it is installed, and the very low hardware interaction with this same station—electrical power supply and the network—the securing circuit according to the invention benefits from good integrity, that is to say that its state can be modified only by an intervention on the part of an administrator external to the computer station. Furthermore, this minimal interaction with the computer station makes it possible to considerably reduce the risks of compromising the data stored on said station.

Furthermore, given the restricted perimeter formed by the circuit according to the invention, any security certification procedures are facilitated.

Another benefit of the circuit according to the invention is that it can integrate other services to be secured such as, for example, an encryption or authentication unit, an intrusion detection system, a trustworthy time reference or a secured startup from the network (PXE).

The circuit according to the invention can notably be used to protect a number of computer stations containing sensitive data and linked to a network, for example in the banking, medical or defence domain. In practice, the level of security that can be obtained on the network streams interchanged by the stations protected with the securing circuit is greater than the level of security generally obtained with the solutions of the prior art.

What is claimed is:

1. An electronic circuit for securing data interchanges between a computer station and a network, said circuit comprising a first network interface connected to said network, said circuit comprising:
a second network interface connected to a network interface of said computer station,
a unit for processing data passing between the first network interface and the second network interface,
an interface for connection to an internal bus of the computer station suitable for electrically connecting an electrical power supply, said electronic circuit not comprising any other means for transferring data to said station, said electronic securing circuit being mounted in a casing of the computer station so that only the network interfaces of said circuit are physically accessible from outside the computer station, an external network interface of the computer station being able to be linked to said second network interface of said circuit by a network cable connected to an outside of the casing of the computer station.

2. The electronic circuit according to claim 1, the computer station being an office personal computer, the circuit being arranged on an integrated electronic card, the connection interface for the electrical power supply to said circuit being formed by a connector of said card, said connector being suitable for being plugged into a slot of a mother card of said computer.

3. The electronic circuit according to claim 2, the computer comprising an internal bus of "Peripheral Component Interconnect" type, the connector of the electronic card being suitable for being plugged into a slot of "Peripheral Component Interconnect" type linked to said internal bus.

4. The electronic circuit according to claim 2, the personal computer comprising, inside the casing, a reset control switch and/or a control switch for switching off said computer, said circuit comprising a module for detecting an anomaly, said module being linked to the reset control switch or to the control switch for switching off the computer.

5. The electronic circuit according to claim 1, further comprising an external interface for configuring security parameters to be applied by a processing unit, a memory for storing said security parameters and a battery suitable for powering said memory in order to maintain a status of said parameters when said circuit is no longer electrically powered.

6. The electronic circuit according to claim 1, further comprising a cryptographic module suitable for encrypting and/or decrypting the data incoming to and outgoing from said circuit.

7. The electronic circuit according to claim 1, further comprising a persistent data memory, said memory storing the programs needed for startup via the network, according to the "Pre-boot eXecution Environment" technique.

8. The electronic circuit according to claim 1, further comprising an IEEE 802.1x-standardized authentication module and a persistent data memory, said memory storing authentication certificates used by the authentication module.

9. A system for securing a computer installation, each computer station to be secured comprising an electronic circuit according to claim 1, each of said stations being connected via the network to a management station suitable for supervising and/or configuring the electronic circuits present in said stations.

10. A system for securing a computer installation, each computer station to be secured comprising an electronic circuit according to claim 1, each of said stations being connected via the network to a management station suitable for supervising and/or configuring the electronic circuits present in said stations.

11. The electronic circuit according to claim 1, the computer station being an office personal computer, the circuit being arranged on an integrated electronic card, the connection interface for the electrical power supply to said circuit being formed by a connector of said card, said connector being suitable for being plugged into a slot of the mother card of said computer.

* * * * *